United States Patent [19]

Anderson et al.

[11] Patent Number: 5,491,048
[45] Date of Patent: Feb. 13, 1996

[54] REMOVAL OF TIN FROM SEASONED PHOTOGRAPHIC COLOR DEVELOPERS

[75] Inventors: Ernest R. Anderson, Rochester; Stephen N. Lowery, Fairport, both of N.Y.

[73] Assignee: Eastman Kodak Company, Rochester, N.Y.

[21] Appl. No.: 391,737

[22] Filed: Feb. 21, 1995

[51] Int. Cl.$^6$ ........................................... G03C 5/31
[52] U.S. Cl. ..................... 430/347; 430/399; 210/688; 423/89; 423/90
[58] Field of Search ............... 423/89, 90; 430/399, 430/347; 210/688

[56] References Cited

U.S. PATENT DOCUMENTS

| | | | |
|---|---|---|---|
| 3,253,920 | 5/1966 | Rees et al. | 430/399 |
| 4,186,007 | 1/1980 | Meckl et al. | 430/399 |
| 4,313,808 | 2/1982 | Idemoto et al. | 204/180 |
| 5,281,631 | 1/1994 | Horwitz et al. | 210/688 |

*Primary Examiner*—Charles L. Bowers, Jr.
*Assistant Examiner*—Mark F. Huff
*Attorney, Agent, or Firm*—John R. Everett

[57] ABSTRACT

A process for removing tin from seasoned photographic color developers containing tin as stannous or stannate complex ions, comprising the steps of:

(a) collecting seasoned photographic color developer containing tin;

(b) treating the collected developer with a resin having a chelating group selected from the group consisting of diphosphonic acid, amidoxime and thiol, thereby removing tin from the composition.

8 Claims, No Drawings

REMOVAL OF TIN FROM SEASONED PHOTOGRAPHIC COLOR DEVELOPERS

FIELD OF THE INVENTION

This invention relates to photographic developers, particularly treatment of seasoned color photographic developers.

BACKGROUND OF THE INVENTION

Photographic processing of exposed silver halide films comprise several steps. The simplest process, used for black and white films, involves, development, fixing, washing, and an optional stop bath. Processes used in processing conventional color films involve development, bleaching, fixing (or combined bleach-fix) and a stabilizer-wash.

In the E-6 reversal process, including variations thereof, photographic reversal film is exposed to a black and white developer, followed by a wash, a reversal bath containing stannous ion, color development, a pre-bleach, bleaching, an optional wash, fixing, and a final wash or rinse. In commercial operations developers are used continuously to develop multiple rolls of photographic films. Moreover environmental regulations are promoting recycling and regeneration of color developers. In these circumstances concentrations of tin can increase. Concentrations greater than about 200 mg/L can have undesirable sensitometric effects on photographic film being developed. At much higher concentrations the stannate form of tin can also produce undesirable effects.

Methods for the removal of tin from seasoned photographic color developers are needed. Moreover, methods of the removal of tin from reversal bath overflows are similarly needed. Seasoned photographic color developers, according to the present specification, are those developers that could adversely affect the sensitometry of films because of the relatively high concentration of tin therein.

SUMMARY OF THE INVENTION

The present invention provides a process for removing tin from seasoned photographic color developers containing tin as stannous or stannate complex ions, comprising the steps of:

(a) collecting seasoned photographic color developer containing tin;

(b) treating the collected developer with a resin having a chelating group selected from the group consisting of diphosphonic acid, amidoxime and thiol, thereby removing tin from the composition.

The method of this invention will allow recycling of higher percentages of seasoned color developers compared to seasoned developers that have not had tin removed. For the purposes of this invention, tin includes stannous ion and stannate ion. Discharge of color developers into the environment is reduced.

The selected chelating resins used in this invention reduce tin concentrations to much lower levels than many chelating or ion exchange resins tested in reducing this invention in practice. Unexpectedly, the resins of this invention can also be regenerated a number of times thereby allowing economic reuse.

DETAILS OF THE INVENTION

Useful chelating resins contain active groups such as diphosphonic acid, amidoxime or thiol. These groups appear to remove the tin by chelation. Any group having a formation constant for tin greater than $10^4$ should be useful in the method of this invention.

The groups are attached to polymeric resins. Suitable polymeric resins include a copolymer of styrene and divinylbenzene, and a copolymer of an acrylate and divinylbenzene. Examples of some commercially available resins with these active groups are Diphonix (diphosphonic acid) from EiChroM Industries, Inc., Duolite CS-346 (amidoxime) and Duolite GT-73 (thiol) from Rohm and Haas. The diphosphonic acid chelating resin is particularly useful since it can be regenerated and reused a number of times.

The above identified resins are capable of removing tin to desired levels without significantly reducing concentrations of other active developer components. Any reduction of tin is desirable. The objective always is to maintain a level of tin that does not adversely effect the sensitometric quality of the developer. Also for environmental purposes, minimizing tin concentration is desirable. We have been able to reduce tin concentrations 18 mg/L in some seasoned color developers.

The method can be carried out independently, or it can be carried in combination with other methods designed to remove other chemicals from seasoned developers. For example, it might be carried out in combination with a process for removal of halides such as bromide ions.

The method of this invention is applicable to any seasoned photographic color developer containing tin. Stannous ion is included in reversal processes to activate residual silver halide following development of the latent image. Typical reversal formulations are disclosed in U.S. Pat. Nos. 2,252,718, 2,950,970 and 3,547,650. Reversal formulations are used in Kodak's E-4 and E-6 processes and in Agfa processes described in the British journal of Photography Annual, 1977, pp. 194–197, and British Journal of Photography, Aug. 2, 1974, pp. 668–669 discloses reversal formulations.

Seasoned photographic color developer can be collected from developer overflow from the developer tank of a processor during processing, during automatic replenishment of the developer or both during processing and replenishment. Collection of the seasoned developer can be carried out in an off-line tank until sufficient quantity is available for the treatment with the resin. No particular amount of seasoned photographic color developer must be collected before treatment with the resin. However, in a batch process it is practicable that enough be collected to exhaust the resins tin chelating capacity in a single run. A single cycle may involve passing the seasoned developer through the resin up to 25 bed volumes in a single pass. Bed volumes is defined hereinafter in the Examples.

Halides, such as bromide can be removed from the seasoned photographic color developer before or after removal of the tin using known techniques. Such techniques are disclosed in U.S. Pat. No. 3,253,920.

In one useful embodiment the seasoned photographic color developer is passed through a column containing a resin having the above identified functional groups. Generally the volume of developer passed through the column will be determined by the volume of resin in the column. From 4,400 to 18,000 mL of developer can be adequately treated by 200 mL of resin.

Suitable columns may have a bed volume in the range of 1 to 20 cubic feet. Other column sizes may be useful depending upon the volume of the solution to be treated. They may be made from glass, fiberglass or plastic lined steel and have size diameter/height ratios of 1:2.5 to 1:8.

The process is not limited to a column configuration or a batch process. It may be carried out continuously using an "in-line" approach. The in-line approach can be carried out by passing the developer over-flow directly from the developer tank to an in-line column containing the resin.

After the tin, and optionally, halide ions are removed, the resulting developer is reconstituted for reuse in reversal photographic development processes. The developers are reconstituted by addition of the required chemicals to make a useful photographic color developer composition by techniques known in the art. Such methods are disclosed in U.S. Pat. No. 3,253,920.

The resins used to remove tin can be regenerated. Regeneration can be carried out by passing through the column (1) 1 to 5 bed volumes of water, (2) 10 bed volumes or more of 2M HCl (3) 4 to 10 bed volumes of water, (4) at least 20 bed volumes of 0.8M NaOH/L and (5) 4 to 10 bed volumes of water. The resins used for the removal of halide ion (bromide) can be regenerated in the same manner. The diphosphonic acid resin can be regenerated about 22 times and still retain its tin chelating capacity. Other resins studied could be regenerated no more than 5 or 6 times and still retain tin chelating capability.

The following examples establish the utility of the present invention.

EXAMPLE 1

Two hundred milliliters of a diphosphonic acid functionalized resin were charged to a 28.5-inch (72.4 cm) long, 1-inch (2.54 cm) diameter glass column. A second column of similar size and containing Amberlite IRA-440C (a quaternary amine functionalized styrene divinylbenzene copolymer) was connected in series. Two hundred milliliters of resin were charged to this column. Amberlite IRA-440C is a resin used by those in the photoprocessing trade to treat E-6 Color Developers to remove bromide. Seasoned LoRR E-6 Color Developer solutions were pumped through the columns at 0.1 BV/minute for 24 cycles.

A cycle comprises two parts. The first part involves the treatment of 22 bed volumes (BV) of season color developer with resin. Bed volume is the volume of resin in the column. This is often referred to as the exhaustion or service part of the cycle. This is followed by the regeneration part of the cycle whereby the tin is removed from the resin making fresh sites to remove the tin during the next service part of the cycle.

LoRR E-6 is Lower Replenishment Rate for the E-6 color developer as compared to the replenishment rate for the standard E-6 process. Twenty-two BV were usually treated each cycle.

Table 1 shows the effectiveness of both resins (diphosphonic acid functionalized resin and Amberlite IRA-440C) separately and together for removing tin and bromide from six LoRR E-6 Color Developer constituents.

TABLE 1

| E-6 Color Developer Regeneration Loss | | | |
| --- | --- | --- | --- |
| | Diphonix % Removed | IRA-440C % Removed | Diphonix + IRA-440C % Removed |
| CD-3 | 6 | 15.0 | 19.0 |
| NaBr | 2 | 99.3 | 99.8 |
| $Na_2SO_3$ | 7 | 7.0 | 8.0 |
| Citrazinic Acid | 5 | 92.0 | 93.0 |
| KI | 4 | 88.0 | 94.0 |
| Sn | 82 | 4.0 | 78.0 |

EXAMPLE 2

Duolite GT-73 was evaluated in the same way as described in Example 1. It was regenerated 5 cycles and maintained its tin capacity when using a E-6 LoRR Color Developer.

EXAMPLE 3

Duolite CS-346 was evaluated in the same way as described in Example 1. It was regenerated 2 cycles and maintained its tin capacity when using a E-6 LoRR Color Developer.

The invention has been described in detail with particular reference to preferred embodiments thereof, but it will be understood that variations and modifications can be effected within the spirit and scope of the invention.

We claim:

1. A process for removing tin from seasoned photographic color developers containing tin as stannous or stannate complex ions, comprising the steps of:
   (a) collecting seasoned photographic color developer containing tin;
   (b) treating the collected developer with a resin having a chelating group selected from the group consisting of diphosphonic acid, amidoxime and thiol, thereby removing tin from the seasoned photographic color developers.

2. The process of claim 1 wherein the resin to which the selected chelating group is attached is selected from the group consisting of a copolymer of styrene and divinylbenzene, and a copolymer of an acrylate and divinylbenzene.

3. The process of claim 1 wherein a volume of the seasoned photographic color developer is from 4,400 to 18,000 mL per 200 mL of resin.

4. The process of claim 3 wherein the seasoned photographic color developer is treated by passing it through a column containing the resin.

5. The process of claim 4 wherein the seasoned photographic color developer is cycled and recycled through the column a sufficient number of times to reduce the tin concentration below 18 mg/L.

6. The process of claim 1 wherein the collected seasoned photographic color developer is (a) continuously collected during reversal photographic development and (b) continuously passed through a column containing the resin.

7. The process of claim 1 wherein bromide is removed from the collected seasoned photographic color developer before or after removal of the tin.

8. The process of any one of claims 1–6 wherein bromide is removed from the collected seasoned photographic color developer before removal of the tin.

* * * * *